United States Patent
Yokoyama et al.

(10) Patent No.: US 10,844,199 B2
(45) Date of Patent: Nov. 24, 2020

(54) TIRE RUBBER COMPOSITION AND TIRE

(71) Applicant: SUMITOMO RUBBER INDUSTRIES, LTD., Hyogo (JP)

(72) Inventors: Yuka Yokoyama, Hyogo (JP); Suguru Izumo, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 79 days.

(21) Appl. No.: 16/351,807

(22) Filed: Mar. 13, 2019

(65) Prior Publication Data
US 2019/0309146 A1 Oct. 10, 2019

(30) Foreign Application Priority Data
Apr. 9, 2018 (JP) ................. 2018-074786

(51) Int. Cl.
| | | |
|---|---|---|
| *C08L 15/00* | (2006.01) | |
| *C08L 25/08* | (2006.01) | |
| *B60C 1/00* | (2006.01) | |
| *C08L 9/06* | (2006.01) | |

(52) U.S. Cl.
CPC ............ *C08L 15/00* (2013.01); *B60C 1/0016* (2013.01); *C08L 9/06* (2013.01); *C08L 25/08* (2013.01); *C08L 2205/025* (2013.01); *C08L 2205/035* (2013.01)

(58) Field of Classification Search
CPC ......... C08L 15/00; C08L 25/08; B60C 1/0016
USPC ....................................................... 524/526
See application file for complete search history.

(56) References Cited

U.S. PATENT DOCUMENTS

2014/0371372 A1 12/2014 Hirayama

FOREIGN PATENT DOCUMENTS

| JP | 6253822 A | | 12/2017 |
|---|---|---|---|
| WO | 2013/125614 A | | 8/2013 |
| WO | WO 2016/109724 | * | 7/2016 |

* cited by examiner

Primary Examiner — Deve V Hall
(74) Attorney, Agent, or Firm — Greenblum & Bernstein, P.L.C.

(57) ABSTRACT

Provided is a rubber composition for tires that provides a balanced improvement of wet grip, abrasion resistance, handling stability, and fuel economy during high-speed running, and further has less performance degradation after long-term service. Also provided is a tire including the rubber composition. Included is a rubber composition for tires containing, based on 100% by mass of a rubber component therein: 3-25% by mass of a component derived from an aromatic vinyl monomer; 0-15% by mass of a component derived from a butadiene monomer and having a vinyl configuration; 1-90% by mass of a component derived from a butadiene monomer and having a cis configuration; and 1-6% by mans of a component derived from an isoprene monomer and having a cis configuration, the rubber composition having, after vulcanization, physical properties satisfying the following relationships (1) and (2):

$-25°\ C.<Tg<0°\ C.$ (1); and $65<Hs<75$ (2).

12 Claims, No Drawings

TIRE RUBBER COMPOSITION AND TIRE

TECHNICAL FIELD

The present invention relates to a rubber composition for tires and a tire.

BACKGROUND ART

In recent years in particular, there has been a growing demand for automobile tires that have well-balanced fuel economy, grip performance, and abrasion resistance. In response to this demand, Patent Literature 1, for example, discloses a technique that involves combining a specific modified diene rubber with a specific silica.

CITATION LIST

Patent Literature

Patent Literature 1: WO 2013/125614

SUMMARY OF INVENTION

Technical Problem

It can be considered that grip performance (e.g. wet grip) may be improved by adding a large amount of plasticizers such as resins, while abrasion resistance may be improved by adding a large amount of fillers such as silica. With these techniques, however, silica is difficult to disperse, and therefore abrasion resistance tends to be insufficiently improved.

Moreover, when high-speed running is desired as in European countries, for example, it tends to be particularly difficult to achieve abrasion resistance and fuel economy simultaneously.

Moreover, as the improvement in abrasion resistance extends the life of tires, it is desirable to prevent degradation of their properties even after long-term service. However, there is still room for improvement in terms of performance degradation after long-term service.

Moreover, when tires are to be used under high-speed running conditions for a long period of time, merely increasing the amount of fillers (typically silica) or plasticizers as in the prior art tends to fail to ensure sufficient abrasion resistance, wet grip, and handling stability, as compared to when tires are to be used in low- to medium-speed ranges. Thus, there has been a need to develop a rubber composition that can endure long-term service under high-speed running conditions.

A common technique for ensuring well-balanced properties including fuel economy and wet grip is to incorporate multiple rubber species differing in monomer component or microstructure, e.g., styrene butadiene rubber (SBR) and polybutadiene rubber (BR). However, the incorporation of multiple rubber species may cause problems, such as: phase separation failing to achieve expected properties; performance degradation in certain temperature ranges; or uneven filler distribution leading to reduced abrasion resistance.

In order to improve fuel economy, it is known to use high-cis BR or SBR with low (about 10% by mass) styrene and vinyl contents as a rubber component with a reduced amount of monomer components that can cause high heat build-up (e.g., styrene and vinyl units). With such techniques, however, grip performance tends to decrease due to the decrease in the amount of styrene and vinyl units. Further, due to the reduced amount of vinyl units which are likely to contribute to crosslinking, mechanical strength tends to be sufficient, thereby resulting in reduced abrasion resistance.

A technique has also been developed which incorporates a thermoplastic elastomer to improve abrasion resistance and processability. However, since common thermoplastic elastomers have lower hardness at high temperatures, this technique tends to cause reduced handling stability during high-speed running.

As described, it has been difficult to achieve a balanced improvement of tire properties such as fuel economy while taking into account maintaining the properties during high-speed running or after long-term service.

The present invention aims to solve the problems and provide: a rubber composition for tires that provides a balanced improvement of wet grip, abrasion resistance, handling stability, and fuel economy during high-speed running, and further has less performance degradation after long-term service; and a tire including the rubber composition.

Solution to Problem

The present invention relates to a rubber composition for tires, containing, based on 100% by mass of a rubber component therein:

3 to 25% by mass of a component derived from an aromatic vinyl monomer;

0 to 15% by mass of a component derived from a butadiene monomer and having a vinyl configuration;

1 to 90% by mass of a component derived from a butadiene monomer and having a cis configuration; and 1 to 6% by mass of a component derived from an isoprene monomer and having a cis configuration, the rubber composition having, after vulcanization, physical properties satisfying the following relationships (1) and (2)

$$-25° C. < Tg < 0° C. \tag{1}$$

wherein Tg denotes a temperature at tan δ peak determined by viscoelastic measurements at a frequency of 10 Hz, an initial strain of 10%, and a dynamic strain amplitude of 0.25%; and $$65 < Hs < 75 \tag{2}$$

wherein Hs denotes a hardness at 23° C. measured in accordance with JIS K6253,

The rubber composition preferably has a viscoelastic spectrum with a single peak at −80° C. or higher obtained by viscoelastic measurements at a frequency of 10 Hz, an initial strain of 10%, and a dynamic strain amplitude of 0.25%.

The viscoelastic spectrum preferably shows a single peak at −90° C. or higher.

The rubber composition preferably has, after vulcanization, physical properties satisfying the following relationships (3) and (4):

$$\tan δ1 > 0.80 \tag{3}$$

and $$\tan δ2 < 0.15 \tag{4}$$

wherein tan δ1 denotes a tan δ at −5° C. determined by viscoelastic measurements at a frequency of 10 Hz, an initial strain of 10%, and a dynamic strain amplitude of 2%, and tan δ2 denotes a tan δ at 80° C. determined by viscoelastic measurements at a frequency of 10 Hz, an initial strain of 10%, and a dynamic strain amplitude of 2%.

The rubber component preferably includes a solution-polymerized styrene butadiene rubber that has 25% by mass or less of a component derived from a butadiene monomer and having a vinyl configuration based on 100% by mass of components derived from a butadiene monomer.

The solution-polymerized styrene butadiene rubber preferably has a weight average molecular weight of 800,000 or more.

The rubber component preferably includes at least one selected from the group consisting of hydrogenated styrene butadiene rubbers, styrene-based thermoplastic elastomers, and olefin/conjugated diene/styrene copolymers.

The rubber composition preferably contains silica in an amount of 100 to 300 parts by mass per 100 parts by mass of the rubber component.

The rubber component preferably has a single phase morphology.

The rubber composition preferably contains a resin having a softening point of 25° C. or higher in an amount of 1 to 60 parts by mass per 100 parts by mass of the rubber component.

The resin is preferably at least one selected from the group consisting of styrene-based resins, terpene-based resins, C5 resins, C5/C9 resins, DCPD-based resins, and rosin-based resins.

The rubber composition is preferably a rubber composition for cap treads.

Another aspect of the present invention relates to a tire, including: a cap tread including the rubber composition; and a base tread including a rubber composition that contains, based on 100% by mass of a rubber component therein, 10% by mass or more of a styrene butadiene rubber.

Advantageous Effects of Invention

The rubber composition for tires of the present invention contains, based on 100% by mass of the rubber component therein: 3 to 25% by mass of a component derived from an aromatic vinyl monomer; 0 to 15% by mass of a component derived from a butadiene monomer and having a vinyl configuration; 1 to 90% by mass of a component derived from a butadiene monomer and having a cis configuration; and 1 to 6% by mass of a component derived from an isoprene monomer and having a cis configuration. Further, the rubber composition has, after vulcanization, physical properties satisfying relationships (1) and (2). Such a rubber composition provides a balanced improvement of wet grip, abrasion resistance, handling stability, and fuel economy during high-speed running, and further has less performance degradation after long-term service.

DESCRIPTION OF EMBODIMENTS

The rubber composition of the present invention contains, based on 100% by mass of the rubber component therein: 3 to 25% by mass of a component derived from an aromatic vinyl monomer; 0 to 15% by mass of a component derived from a butadiene monomer and having a vinyl configuration; 1 to 90% by mass of a component derived from a butadiene monomer and having a cis configuration; and 1 to 6% by mass of a component derived from an isoprene monomer and having a cis configuration. Further, the rubber composition has, after vulcanization, physical properties satisfying relationships (1) and (2).

When a rubber composition is prepared by controlling the composition of the rubber component to satisfy the above-mentioned ranges and further adjusting the physical properties after vulcanization to satisfy relationships (1) and (2), the rubber composition provides a balanced improvement of wet grip, abrasion resistance, handling stability, and fuel economy during high-speed running, which is difficult to achieve by conventional techniques.

Moreover, a rubber composition which has, after vulcanization, physical properties satisfying relationships (1) and (2) may be prepared by controlling the composition of the rubber component to satisfy the above-mentioned ranges and optionally adding fillers, plasticizers, or other chemicals. The rubber component having a composition controlled to satisfy the above-mentioned ranges allows chemicals to disperse well in the rubber composition, thereby reducing migration of the chemicals to other tire components or surfaces. Thus, performance degradation after long-term service can be reduced.

Relationship (1) is as follows:

$$-25° \text{ C.} < Tg < 0° \text{ C.} \quad (1)$$

wherein Tg denotes the temperature (grass transition temperature) at tan δ peak determined by viscoelastic measurements at a frequency of 10 Hz, an initial strain of 10%, and a dynamic strain amplitude of 0.25%.

Rubber compositions containing SBR with styrene and vinyl contents of about 10% by mass have been developed in view of fuel economy and other properties. Such rubber compositions mostly have a Tg of lower than −25° C. which tends to lead to reduced wet grip or handling stability during high-speed running. In contrast, the present rubber composition has a Tg in the range of relationship (1) to ensure good wet grip and good handling stability even during high-speed running.

The Tg in relationship (1) preferably satisfies −25° C.<Tg≤−5° C., more preferably −25° C.<Tg≤−10° C. -10° C.

Relationship (2) is as follows:

$$65 < Hs < 75 \quad (2)$$

wherein Hs denotes the hardness at 23° C. measured in accordance with JIS K6253.

The present rubber composition has a Hs satisfying relationship (2) to provide a balanced improvement of handling stability, fuel economy, and abrasion resistance.

The Hs in relationship (2) is preferably 66 or greater but is preferably 73 or lower, more preferably 71 or lower.

The rubber composition preferably has, after vulcanization, physical properties that further satisfies the following relationships (3) and (4):

$$\tan \delta 1 > 0.80 \quad (3) \text{ and}$$

$$\tan \delta 2 < 0.15 \quad (4)$$

wherein tan δ1 denotes the tan δ at −5° C. determined by viscoelastic measurements at a frequency of 10 Hz, an initial strain of 10%, and a dynamic strain amplitude of 2%, and tan δ2 denotes the tan δ at 80° C. determined by viscoelastic measurements at a frequency of 10 Hz, an initial strain of 10%, and a dynamic strain amplitude of 2%.

The rubber composition may have a tan δ1 of more than 0.80 as in (3) to further improve wet grip during high-speed running. The upper limit of the tan δ1 in relationship (3) is not particularly critical.

In general, wet grip is evaluated based on tan δ at 0° C. However, the present inventors have newly recognized that particularly good wet grip may be achieved by controlling tan δ at −5° C.

The rubber composition may have a tan δ2 of less than 0.15 as in (4) to achieve both fuel economy and wet grip. The tan δ2 in relationship (4) is preferably 0.14 or less but is preferably 0.05 or more, more preferably 0.08 or more.

In general, fuel economy is evaluated based on tan δ at 30 to 70° C. However, the present inventors have newly recognized that both good fuel economy and good wet grip may be achieved by controlling tan δ at 80° C.

The rubber composition preferably has a viscoelastic spectrum with a single peak at −80° C. or higher, more preferably at −90° C. or higher, obtained by viscoelastic measurements at a frequency of 10 Hz, an initial strain of 10%, and a dynamic strain amplitude of 0.25%. The term "single peak" means that only one peak is observed in the viscoelastic spectrum, and quantitatively means that there is only one section where tan δ declines after an increase of 0.2 or more. In this case, it is possible to achieve a balanced improvement of abrasion resistance, handling stability, fuel economy, and performance maintenance during long-term service. The presence of a single peak indicates good affinity among the components of the rubber composition. Thus, the rubber composition having a single peak can exhibit good properties under a wide range of use conditions (speed, temperature, and load).

A rubber composition which has, after vulcanization, physical properties satisfying relationships (1) to (4) and further shows a viscoelastic spectrum with a single peak within the predetermined range may be prepared by controlling the amounts of a component derived from an aromatic vinyl monomer, a component derived from a butadiene monomer and having a vinyl configuration, a component derived from a butadiene monomer and having a cis configuration, and a component derived from an isoprene monomer and having a cis configuration to fall within the respective ranges described above and optionally adding rubber, filler, plasticizer, or other components as described later. Examples of plasticizers that can be used include oils and liquid rubbers.

The design guidelines for the rubber composition satisfying the above conditions will be described below. The design guidelines below are merely examples and are not intended to limit the present invention.

Exemplary techniques for reducing Tg include reducing the styrene content and/or vinyl content of the rubber component, reducing the amount of resins having a high Tg, or incorporating highly polar plasticizers. Exemplary techniques for increasing Tg include increasing the styrene content and/or vinyl content of the rubber component or increasing the amount of resins having a high Tg.

Exemplary techniques for reducing Hs include reducing the amount of fillers such as silica and carbon black, increasing the amount of plasticizers such as resins and oils, or reducing the amount of crosslinking agents such as sulfur. Exemplary techniques for increasing Hs include increasing the amount of fillers such as silica and carbon black, reducing the amount of plasticizers such as resins and oils, or increasing the amount of crosslinking agents such as sulfur.

Exemplary techniques for reducing tan δ1 include controlling the Tg of the rubber composition to a temperature far from −5° C., reducing the amount of fillers such as silica and carbon black, or reducing the amount of plasticizers such as resins and oils. Exemplary techniques for increasing tan δ1 include controlling the Tg of the rubber composition to a temperature close to −5° C., increasing the amount of fillers such as silica and carbon black, or increasing the amount of plasticizers such as resins and oils.

Exemplary techniques for reducing tan δ2 include reducing the amount of fillers such as silica and carbon black, reducing the styrene content and/or vinyl content of the rubber component, improving filler dispersion, or strengthening bonding between the rubber component and fillers with coupling agents or the like. Exemplary techniques for increasing tan δ2 include increasing the amount of fillers such as silica and carbon black, increasing the styrene content and/or vinyl content of the rubber component, or deteriorating filler dispersion.

Exemplary techniques for allowing the viscoelastic spectrum to have a single peak include incorporating highly compatible rubber and resin components to form a nearly single phase morphology.

Exemplary techniques for shifting the peak position to the higher temperature side include increasing the amount of chemicals (rubber, resin, or other components) having a high Tg.

The term "component derived from an aromatic vinyl monomer" refers to an aromatic vinyl compound-based unit in a (co)polymer produced by (co)polymer nation of an aromatic vinyl compound. The rubber component containing the component derived from an aromatic vinyl monomer (aromatic vinyl unit) may include styrene butadiene rubber (SBR).

The term "component derived from a butadiene monomer" refers to a 1,3-butadiene-based unit in a (co)polymer produced by (co)polymerization of 1,3-butadiene, and this term also includes units hydrogenated after the (co)polymerization. The rubber component containing the component derived from a butadiene monomer (butadiene unit) may include SBR or polybutadiene rubber (BR).

The term "component derived from an isoprene monomer" refers to an isoprene-based unit in a (co)polymer produced by (co)polymerization of isoprene. The rubber component containing the component derived from an isoprene monomer (isoprene unit) may include natural rubber (NR) or polyisoprene rubber (IR).

The amount of the component derived from an aromatic vinyl monomer (aromatic vinyl unit) based on 100% by mass of the rubber component is 3 to 25% by mass. In view of fuel economy, abrasion resistance, and wet grip, it is preferably 5 to 25% by mass, more preferably 8 to 25% by mass.

Examples of the aromatic vinyl monomer include styrene, α-methylstyrene, vinyltoluene, vinylnaphthalene, divinylbenzene, trivinylbenzene, and divinylnaphthalene. These may be used alone or in combinations of two or more. Preferred among these is styrene.

The amount of the component derived from a butadiene monomer and having a vinyl configuration (vinyl-butadiene unit) based on 100% by mass of the rubber component is 0 to 15% by mass. In view of abrasion resistance and mechanical strength, it is preferably 0.5% by mass or more, more preferably 1% by mass or more. In view of abrasion resistance and performance maintenance during long-term service, it is preferably 12% by mass or less, more preferably 10% by mass or less, still more preferably 8% by mass or less.

The amount of the component derived from a butadiene monomer and having a cis configuration (cis-butadiene unit) based on 100% by mass of the rubber component is 1 to 90% by mass. It is preferably 5% by mass or more, more preferably 10% by mass or more, but is preferably 80% by mass or less. When the amount falls within the range indicated above, good rubber elasticity can be obtained, and a balanced improvement of abrasion resistance, mechanical strength, and performance maintenance during long-term service can be achieved.

The amount of the component derived from an isoprene monomer and having a cis configuration (cis-isoprene unit) based on 100% by mass of the rubber component is 1 to 6% by mass, preferably 2 to 6% by mass. When the amount falls within the range indicated above, a balanced improvemrnt of abrasion resistance, mechanical strength, and performance maintenance during long-term service can be achieved.

In general, reducing the amount of vinyl-butadiene units in a rubber component tends to improve fuel economy but reduce mechanical strength and handling stability. In the present invention, the cis-isoprene content is controlled within the aforementioned range so that good mechanical strength and good handling stability can be obtained while having the fuel economy-improving effect owing to the reduced amount of vinyl-butadiene units.

The amounts of the aromatic vinyl unit, vinyl-butadiene unit, cis-butadiene unit, and cis-isoprene unit in the rubber component may be calculated from the ratios of the integrals of the peaks attributed to these units using a nuclear magnetic resonance (NMR) device. If the vulcanized rubber composition is difficult to measure by NMR, the amounts may be calculated from the peak intensities attributed to the units using infrared spectroscopy (IR).

The rubber component in the rubber composition preferably has a single phase morphology. The term "single phase morphology" means a rubber component in which multiple rubber phases are not observed with a microscope such as a transmission electron microscope (TEM), and does not include filler aggregation and a non-uniform filler/polymer (rubber component) bonded phase. Conventional rubber compositions for tires often contain a plurality of rubber component species incompatible with each other to achieve a balanced improvement of different properties, and thus often have a non-uniform morphology. In contrast, the present rubber composition contains the aromatic vinyl unit, vinyl-butadiene unit, cis-butadiene unit, and cis-isoprene unit in amounts controlled within the respective ranges indicated above so that a single phase morphology can be easily obtained. The rubber composition having a single phase morphology provides a balanced improvement of wet grip, abrasion resistance, handling stability, and fuel economy during high-speed running, as well as performance maintenance during long-term service.

The term "rubber component" used in the rubber composition includes diene rubbers, thermoplastic elastomers, and the like that are solid at room temperature (20° C.) but does not include liquid rubbers serving as plasticizers, and resins having no rubber elasticity. The rubber component may include a single species or a combination of two or more species.

Examples of the diene rubbers include homopolymers of diene monomers, copolymers of multiple diene monomers, and copolymers of diene monomers and additional monomers such as aromatic vinyl monomers (e.g., SBR, BR, NR, IR, and butyl rubber (IIR)). The amount of the additional monomers is not limited as long as rubber elasticity is not impaired. The diene rubber may be modified at the backbone and/or chain end with a polar group, and may be fused and/or branched using a catalyst. The diene rubbers may be used alone or in combinations of two or more.

The rubber component of the rubber composition preferably includes a solution-polymerized SBR (S-SBR). This provides a balanced improvement of processability and wet grip.

In the S-SBR, the amount of a component derived from a butadiene monomer and having a vinyl configuration (vinyl-butadiene unit) based on 100% by mass of components derived from a butadiene monomer is preferably 0.1% by mass or more, more preferably 0.2% by mass or more, still more preferably 0.5% by mass or more. When the amount falls within the range indicated above, crosslinking reactions and reactions with silane coupling agents can be promoted to achieve a balanced improvement of fuel economy and abrasion resistance. The amount of the vinyl-butadiene unit is also preferably 28% by mass or less, more preferably 27% by mass or less, still more preferably 25% by mass or less. When the amount falls within the range indicated above, the increase in the Tg of the rubber component can be reduced to improve low-temperature properties. Further, the S-SBR has better affinity and compatibility with other rubber component species so that good fracture resistance can be obtained.

In the S-SBR, the amount of a component derived from a butadiene monomer and having a cis configuration (cis-butadiene unit) based on 100% by mass of components derived from a butadiene monomer is preferably 20% by mass or more but is preferably 90% by mass or less. When the amount falls within the range indicated above, good rubber elasticity can be obtained so that a balanced improvement of abrasion resistance and fracture resistance can be achieved.

The S-SBR preferably has a styrene content (amount of styrene units based on 100% by mass of the S-SBR) of 1% by mass or more, more preferably 3% by mass or more, still more preferably 5% by mass or more, but preferably 40% by mass or less, more preferably 30% by mass or less, still more preferably 25% by mass or less. When the styrene content falls within the range indicated above, a balanced improvement of wet grip and fuel economy can be achieved. Further, the S-SBR has better affinity and compatibility with other rubber component species so that good fracture resistance can be obtained.

The S-SBR is preferably modified at the chain end and/or backbone with a polar group that is interactive with a filler such as silica. Non-limiting examples of the polar group (modifying group) include alkoxysilyl, amino, hydroxy, carboxyl, and epoxy groups. These may be used alone or in combinations of two or more. Preferred among these are alkoxysilyl groups.

In view of abrasion resistance and mechanical strength, the S-SBR preferably has a weight average molecular weight (Mw) of 500,000 or more, more preferably 600,000 or more, still more preferably 700,000 or more, further preferably 800,000 or more, even further preferably 900,000 or more, still further preferably 1,000,000 or more. The upper limit of the Mw is not particularly defined, but it is preferably 3,000,000 or less in view of processability.

The S-SBR may contain a block of isoprene-derived components (isoprene block) in the molecular chain. This provides a balanced improvement of fuel economy, abrasion resistance, and handling stability. The isoprene block is preferably a block of cis-isoprene-derived components (cis-isoprene block).

The amount of the S-SBR based on 100% by mass of the rubber component is preferably 10% by mass or more, more preferably 25% by mass or more, but is preferably 99% by mass or less, more preferably 97% by mass or less. When the amount falls within the range indicated above, the effects of the present invention tend to be better achieved.

The amount of the S-SBR herein does not include the amount of the hydrogenated SBR described below.

The rubber component of the rubber composition may include an SBR whose butadiene units are partly hydrogenated (hydrogenated SBR). The hydrogenated SBR has the following effects: improved affinity for plasticizers due to the reduced amount of double bonds resulting from hydrogenation; and a uniform crosslinked structure resulting from the reduction in sites reactive with crosslinking agents. Thus, abrasion resistance and performance maintenance during long-term service can be further improved.

The degree of hydrogenation of the butadiene units of the hydrogenated SBR is preferably 50% by mass or higher, more preferably 70% by mass or higher, but is preferably 99% by mass or lower, more preferably 98% by mass or lower. When the degree of hydrogenation falls within the range indicated above, handling stability, mechanical strength, abrasion resistance, and performance maintenance during long-term service can be further improved.

The degree of hydrogenation refers to the percentage of hydrogenated butadiene units based on 100% by mass of the total butadiene units, and may be calculated from the rate of decrease in the spectral intensities corresponding to unsaturated bonds determined by $^1$H-NMR.

The hydrogenation may be carried out by any method under any reaction conditions, including known methods and known conditions. Usually, the hydrogenation is carried out at 20 to 150° C. under a hydrogen pressure of 0.1 to 10 MPa in the presence of a hydrogenation catalyst. The degree of hydrogenation may be set appropriately by changing, for example, the amount of the hydrogenation catalyst, hydrogen pressure during the hydrogenation reaction, or duration of the reaction. The hydrogenation catalyst may usually include a compound containing any of the metals of groups 4 to 11 of the periodic table. For example, compounds containing Ti, V, Co, Ni, Zr, Ru, Rh, Pd, Hf, Re, and Pt atoms can be used as hydrogenation catalysts. More specific examples or the hydrogenation catalyst include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes of Ru, Rh, or other metals; and fullerenes and carbon nanotubes in which hydrogen is stored.

Among the above examples, metallocene compounds containing Ti, Zr, Hf, Co, or Ni are preferred because they allow the hydrogenation reaction to be carried out in a homogeneous system in an inert organic solvent. Further, metallocene compounds containing Ti, Zr, or Hf are preferred. In particular, hydrogenation catalysts prepared by reaction of titanocene compounds and alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B, all of which are hereby incorporated by reference. These hydrogenation catalysts may be used alone or in combinations of two or more.

In the hydrogenated SBR, the amount of a component derived from a butadiene monomer and having a vinyl configuration (vinyl-butadiene unit) based on 100% by mass of components derived from a butadiene monomer before hydrogenation is preferably 0 to 10% by mass, more preferably 0 to 5% by mass, still more preferably 0 to 3% by mass. When the amount falls within the range indicated above, mechanical strength, abrasion resistance, and performance maintenance during long-term service can be further improved.

In the hydrogenated SBR, the amount of a component derived from a butadiene monomer and having a cis configuration (cis-butadiene unit) based on 100% by mass of components derived from a butadiene monomer before hydrogenation is preferably 1 to 10% by mass. When the amount falls within the range indicated above, mechanical strength, abrasion resistance, and performance maintenance during long-term service can be further improved.

The hydrogenated SBR is preferably modified at the chain end and/or backbone with a polar group that is interactive with a filler such as silica. Non-limiting examples of the polar group (modifying group) include alkoxysilyl, amino, hydroxy, carboxyl, and epoxy groups. These may be used alone or in combinations of two or more. Preferred among these are alkoxysilyl groups.

The amount of the hydrogenated SBR, if present, based on 100% by mass of the rubber component is preferably 20% by mass or more, more preferably 40% by mass or more, but is preferably 90% by mass or less, more preferably 70% by mass or less. When the amount falls within the range indicated above, the effects of the present invention tend to be better achieved.

The amount of the hydrogenated SBR herein does not include the amount of the S-SBR described above.

The rubber component of the rubber composition may include a styrene-based thermoplastic elastomer (styrene-based TPE) or an olefin/conjugated diene/styrene copolymer. When a rubber composition is prepared by adding them while controlling the composition of the rubber component to satisfy the above-mentioned ranges, the rubber composition can be imparted with moderate elasticity and hardness to further improve handling stability and wet grip. Further, the adhesion between the rubber component species can be enhanced to further improve mechanical strength and abrasion resistance as well. The styrene-based TPE or olefin/conjugated diene/styrene copolymer may include a single species or a combination of two or more species, and may be used together with other rubber component species such as diene rubbers.

The styrene-based TPE refers to a thermoplastic elastomer containing a styrene unit. Specific examples thereof include block copolymers of styrene with butadiene and/or isoprene. Styrene/butadiene/styrene triblock copolymers (SBS), styrene/butadiene/styrene/butadiene tetrablock copolymers (SBSB), and hydrogenated products thereof are particularly suitable. The styrene-based TPE may be produced by any method, e.g., as described in JP 2014-105293 A which is hereby incorporated by reference.

The olefin/conjugated diene/styrene copolymer refers to a copolymer produced by copolymerization of an olefin monomer, a conjugated diene monomer, and a styrene monomer. The olefin/conjugated diene/styrene copolymer may be produced by any method, e.g., as described in JP 4088258 B which is hereby incorporated by reference.

Examples of the olefin monomer used in the olefin/conjugated diene/styrene copolymer include olefins such as ethylene, propylene, 1-butene, 2-butene, isobutene, 1-hexene, 1-octene, 1-heptene, and 1-decene. These may be used alone or in combinations of two or more. Preferred among these is ethylene.

Examples of the conjugated diene monomer used in the olefin/conjugated diene/styrene copolymer include 1,3-butadiene, isoprene, 1,3-pentadiene, 2,3-dimethylbutadiene, and 2-phenyl-1,3-butadiene. These may be used alone or in combinations of two or more. Preferred among these is 1,3-butadiene.

The styrene-based TPE or olefin/conjugated diene/styrene copolymer preferably has a styrene content of 10% by mass or higher, more preferably 20% by mass or higher, but preferably 65% by mass or lower, more preferably 60% by mass or lower. When the styrene content falls within the range indicated above, moderate rubber elasticity and good affinity for other rubber component species can be obtained.

In the styrene-based TPE or olefin/conjugated diene/styrene copolymer, the amount of a component derived from a conjugated diene monomer and having a vinyl configuration based on 100% by mass of components derived from a conjugated diene monomer is preferably 0 to 20% by mass, more preferably 0 to 10% by mass. When the amount falls within the range indicated above, mechanical strength, abrasion resistance, and performance maintenance during long-term service can be further improved.

The amount of the styrene-based TPE, if present, based on 100% by mass of the rubber component is preferably 1% by mass or more, more preferably 5% by mass or more, but is preferably 80% by mass or less, more preferably 50% by mass or less. The amount of the olefin/conjugated diene/styrene copolymer is as described above. When the amount falls within the range indicated above, well-balanced elastic modulus, fuel economy, abrasion resistance, and mechanical strength can be obtained.

The rubber component of the rubber composition preferably includes an isoprene-based rubber. Examples of the isoprene-based rubber include NR, IR, refined NR, modified NR, and modified IR. The NR and IR may be those commonly used in the tire industry. Examples of the NR include SIR20, RSS #3, and TSR20. Examples of the IR include IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These isoprene-based rubbers may be used alone or in combinations of two or more. Among these, refined NR is preferred, with UPNR being more preferred.

Examples of the UPNR include those produced as described in JP 5650797 B which is hereby incorporated by reference. The UPNR preferably has a pH of 2 to 7, more preferably 3 to 6, still more preferably 4 to 6. The UPNR preferably has a phosphorus content of 200 ppm or less, more preferably 150 ppm or less. The UPNR preferably has a nitrogen content of 0.15% by mass or less, more preferably 0.1% by mass or less, as determined after it is immersed in acetone at 25° C. for 48 hours.

The amount of the isoprene-based rubber, if present, based on 100% by mass of the rubber component may be adjusted within a range that satisfies the composition of the rubber component described earlier. The amount is preferably 1% by mass or more, more preferably 2% by mass or more, but is preferably 10% by mass or less, more preferably 5% by mass or less.

The rubber component of the rubber composition may include BR. Non-limiting examples of the BR include those known in the tire field, such as BR having a cis content of 95% by mass or higher (high-cis BR) and BR containing syndiotactic polybutadiene crystals. Among these, high-cis BR is suitable. The BR may be either unmodified BR or modified BR. Examples of commercial products include products of Ube Industries, Ltd., JSR Corporation, Asahi Kasei Corporation, and Zeon Corporation. These may be used alone or in combinations of two or more.

The amount of the BR, if present, based on 100% by mass of the rubber component may be adjusted within a range that satisfies the composition of the rubber component described earlier. The amount is preferably 1% by mass or more, more preferably 5% by mass or more, but is preferably 20% by mass or less, more preferably 15% by mass or less.

The rubber composition may contain a filler, examples of which include silica, carbon black, aluminum hydroxide, magnesium hydroxide, calcium carbonate, talc, alumina, and clay. These may be used alone or in combinations of two or more. Preferred among these is silica or carbon black.

The rubber composition may contain silica to further improve wet grip, abrasion resistance, fuel economy, and performance maintenance during long-term service.

Examples of the silica include dry silica (anhydrous silicic acid) and wet silica (hydrous silicic acid). Wet silica is preferred because it has a large number of silanol groups. These types of silica may be used alone or in combinations of two or more.

The silica preferably has a nitrogen adsorption specific surface area ($N_2SA$) of 150 $m^2/g$ or more, more preferably 170 $m^2/g$ or more, still more preferably 200 $m^2/g$ or more, but preferably 300 $m^2/g$ or less, more preferably 250 $m^2/g$ or less. When the $N_2SA$ falls within the range indicated above, the effects of the present invention tend to be better achieved.

The $N_2SA$ of the silica is measured by the BET method in accordance with ASTM D3037-81.

The silica preferably has a cetyltrimethylammonium bromide (CTAB) specific surface area of 150 $m^2/g$ or more, more preferably 190 $m^2/g$ or more, still more preferably 200 $m^2/g$ or more, but preferably 300 $m^2/g$ or less, more preferably 250 $m^2/g$ or less. When the CTAB specific surface area falls within the range indicated above, the effects of the present invention tend to be better achieved.

The CTAB specific surface area of the silica is measured in accordance with ASTM D3765-92.

The silica may be a product of, for example, Degussa, Rhodia, Tosoh Silica Corporation, Solvay Japan, or Tokuyama Corporation.

The amount of the silica, if present, per 100 parts by mass of the rubber component is preferably 50 parts by mass or more, more preferably 80 parts by mass or more, still more preferably 90 parts by mass or more, particularly preferably 100 parts by mass or more. When the amount falls within the range indicated above, wet grip and abrasion resistance can be further improved. The upper limit of the amount is not particularly limited, but in view of processability and rubber elasticity, it is preferably 300 parts by mass or less, more preferably 200 parts by mass or less, still more preferably 180 parts by mass or less.

The silica is preferably used in combination with a silane coupling agent. In this case, the effects of the present invention tend to be better achieved.

Non-limiting examples of the silane coupling agent include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)

disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. Preferred among these are sulfide and mercapto silane coupling agents, with mercapto silane coupling agents being more preferred.

The mercapto silane coupling agent used is preferably a compound represented by the formula (I) below. With such a mercapto silane coupling agent, the effects of the present invention tend to be better achieved.

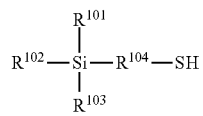

(I)

In formula (I), $R^{101}$ to $R^{103}$ may be the same as or different from one another and each represent a branched or unbranched C1-C12 alkyl group, a branched or unbranched C1-C12 alkoxy group, or a group represented by —O—$(R^{111}$—O$)_b$—$R^{112}$ where the $R^{111}$ groups, whose number is b, may be the same as or different from one another and each represent a branched or unbranched divalent C1-C30 hydrocarbon group, $R^{112}$ represents a branched or unbranched C1-C30 alkyl group, a branched or unbranched C2-C30 alkenyl group, a C6-C30 aryl group, or a C7-$C_{30}$ aralkyl group, and b represents an integer of 1 to 30; and $R^{104}$ represents a branched or unbranched C1-C6 alkylene group.

$R^{101}$ to $R^{103}$ each represent a branched or unbranched C1-C12, preferably C1-C5, alkyl group, a branched or unbranched C1-C12, preferably C1-C5, alkoxy group, or a group represented by —O—$(R^{111}$—O$)_b$—$R^{112}$. To well achieve the effects of the present invention, preferably at least one of $R^{101}$ to $R^{103}$ groups is a group represented by —O—$(R^{111}$—O$)_b$—$R^{112}$. More preferably, two of $R^{101}$ to $R^{103}$ groups are groups represented by —O—$(R^{111}$—O$)_b$—$R^{112}$ and the other one is a branched or unbranched C1-C12 alkoxy group.

$R^{111}$ in the group: —O—$(R^{111}$—O$)_b$—$R^{112}$ for $R^{101}$ to $R^{103}$ represents a branched or unbranched divalent hydrocarbon group having 1 to 30 carbon atoms, preferably 1 to 15 carbon atoms, more preferably 1 to 3 carbon atoms. Examples of the hydrocarbon group include alkylene, alkenylene, and arylene groups. Preferred among these are alkylene groups.

The number b represents an integer of 1 to 30, preferably 2 to 20, more preferably 3 to 7, still more preferably 5 to 6.

$R^{112}$ represents a branched or unbranched C1-C30 alkyl group, a branched or unbranched C2-C30 alkenyl group, a C6-C30 aryl group, or a C7-C30 aralkyl group, and is preferably the alkyl group.

Specific examples of the group —O—$(R^{111}$—O$)_b$—$R^{112}$ include —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_5$—$C_{13}H_{27}$, —O—$(C_2H_4$—O$)_4$—$C_{13}H_{27}$, —O—$(C_2H_4$—O$)_6$—$C_{13}H_{27}$, and —O—$(C_2H_4$—O$)_7$—$C_{13}H_{27}$. Preferred among these are —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, and —O—$(C_2H_4$—O$)_6$—$C_{13}H_{27}$.

The branched or unbranched C1-C6, preferably C1-C5, alkylene group as $R^{104}$ is as described for $R^{111}$.

Examples of the mercapto silane coupling agent of formula (I) include 3-mercaptopropyltrimethoxysilane, 3-mercaptopropyltriethoxysilane, 2-mercaptoethyltrimethoxysilane, 2-mercaptoethyltriethoxysilane, and a compound represented by the formula below (Si363 available from Evonik), with the compound of the formula below being suitable. These may be used alone or in combinations of two or more.

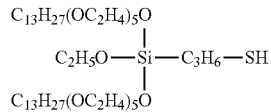

The amount of the silane coupling agent, if present, per 100 parts by mass of the silica is preferably 3 parts by mass or more, more preferably 5 parts by mass or more, but is preferably 20 parts by mass or less, more preferably 15 parts by mass or less. When the amount falls within the range indicated above, the effects of the present invention tend to be better achieved.

Non-limiting examples of the carbon black include N134, N110, N220, N234, N219, N339, N330, N326, N351, N550, and N762. Examples of commercial products include products of Asahi Carbon Co., Ltd., Cabot Japan K.K., Tokai Carbon Co., Ltd., Mitsubishi Chemical Corporation, Lion Corporation, NSCC Carbon Co., Ltd., and Columbia Carbon.

The carbon black preferably has a nitrogen adsorption specific surface area ($N_2SA$) of 90 $m^2/g$ or more, more preferably 130 $m^2/g$ or more, but preferably 200 $m^2/g$ or less, more preferably 160 $m^2/g$ or less. When the $N_2SA$ falls within the range indicated above, the effects of the present invention tend to be better achieved.

The $N_2SA$ of the carbon black is determined in accordance with JIS K 6217-2:2001.

The amount of the carbon black, if present, per 100 parts by mass of the rubber component is preferably 1 part by mass or more, more preferably 5 parts by mass or more, but is preferably 20 parts by mass or less, more preferably 15 parts by mass or less, still more preferably 10 parts by mass or less. When the amount falls within the range indicated above, the effects of the present invention can be more suitably achieved.

The rubber composition preferably contains a resin having a softening point of 25° C. or higher. This improves compatibility of the rubber component while further reducing migration of chemicals to other tire components or surfaces. Therefore, a balanced improvement of wet grip, abrasion resistance, handling stability, and fuel economy during high-speed running, as well as performance maintenance during long-term service can be achieved.

The resin is preferably at least one selected from the group consisting of styrene-based resins, terpene-based resins, C5 resins, C5/C9 resins, DCPD-based resins, and rosin-based resins, and more preferably from styrene-based resins and C5/C9 resins.

The term "styrene-based resin" refers to a polymer mainly having structural units derived from a styrene monomer. Examples of such styrene-based resins include homopolymers of styrene monomers such as styrene or o-methylstyrene, copolymers of two or more styrene monomers, and copolymers of styrene monomers with additional monomers copolymerizable therewith. More preferred among these are copolymers of α-methylstyrene and styrene.

The term "terpene-based resin" refers to a polymer mainly having structural units derived from a terpene monomer. Examples of such terpene-based resins include homopolymers of terpene monomers, copolymers of two or more terpene monomers, and copolymers of terpene monomers with additional monomers copolymerizable therewith (e.g., terpene phenol resins).

The term "C5 resin" refers to a polymer mainly having structural units derived from a C5 fraction. Examples of such C5 resins include homopolymers of C5 fraction components, copolymers of two or more C5 fraction components, and copolymers of C5 fraction components with additional monomers copolymerizable therewith.

The term "C5/C9 resin" refers to a polymer mainly having structural units derived from a C5 fraction and a C9 fraction. Examples of such C5/C9 resins include copolymers of C5 fraction components and C9 fraction components and copolymers of C5 and C9 fraction components with additional monomers copolymerizable therewith. Preferred among these are copolymers of C5 and C9 fraction components.

The term "DCPD-based resin" refers to a polymer mainly having structural units derived from dicyclopentadiene (DCPD). Examples of such DCPD-based resins include homopolymers of DCPD and copolymers of DCPD with additional monomers copolymerizable therewith.

The term "rosin-based resin" refers to a polymer mainly having structural units derived from a rosin monomer. Examples of such rosin-based resins include homopolymers of rosin monomers, copolymers of two or more rosin monomers, and copolymers of rosin monomers with additional monomers copolymerizable therewith.

Exemplary commercial products of the resin include products of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., and TaoKa Chemical Co., Ltd.

The resin has a softening point of 25° C. or higher, preferably 50° C. or higher, more preferably 80° C. or higher, but preferably 120° C. or lower, more preferably 100° C. or lower. When the softening point falls within the range indicated above, the effects of the present invention tend to be better achieved.

Herein, the softening point of the resin is measured in accordance with JIS K 6220-1:2001 with a ring and ball softening point measuring apparatus and defined as the temperature at which the ball drops down.

The amount of the resin, if present, per 100 parts by mass of the rubber component is preferably 1 part by mass or more, more preferably 2 parts by mass or more, still more preferably 5 parts by mass or more, particularly preferably 8 parts by mass or more, but is preferably 80 parts by mass or less, more preferably 70 parts by mass or less, still more preferably 60 parts by mass or less, particularly preferably 55 parts by mass or less. When the amount falls within the range indicated above, a balanced improvement of wet grip, abrasion resistance, and fuel economy during high-speed running, as well as processability can be achieved.

The rubber composition may contain an oil.

Examples of the oil include process oils, vegetable fats and oils, and mixtures thereof. Examples of the process oils include paraffinic process oils, aromatic process oils, and naphthenic process oils. Examples of the vegetable fats and oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. Preferred among these are process oils and vegetable fats and oils, with aromatic process oils such as treated distillate aromatic extracts (TDAE) being more preferred, because the effects of the present invention can be well achieved.

The amount of the oil, if present, per 100 parts by mass of the rubber component is preferably 10 parts by mass or more, more preferably 20 parts by mass or more, but is preferably 50 parts by mass or less, more preferably 40 parts by mass or less. When the amount falls within the range indicated above, the effects of the present invention tend to be better achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Preferred among these are petroleum waxes, with paraffin waxes being more preferred.

The wax may be a product of, for example, Ouchi Shinko Chemical Industrial Co., Ltd., Nippon Seiro Co., Ltd., or Seiko Chemical Co., Ltd.

The amount of the wax, if present, per 100 parts by mass of the rubber component is preferably 1 part by mass or more, more preferably 2 parts by mass or more, but is preferably 20 parts by mass or less, more preferably 10 parts by mass or less. When the amount falls within the range indicated above, the effects of the present invention tend to be better achieved.

The rubber composition may contain an antioxidant.

Examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. These may be used alone or in combinations of two or more. Preferred among these are p-phenylenediamine or quinoline antioxidants.

The antioxidant may be a product of, for example, Seiko Chemical Co., Ltd., Sumitomo Chemical Co., Ltd., Ouchi Shinko chemical Industrial Co., Ltd., or Flexsys.

The amount of the antioxidant, if present, per 100 parts by mass of the rubber component is preferably 1 part by mass or more, more preferably 2 parts by mass or more, but is preferably 10 parts by mass or less, more preferably 8 parts by mass or less. When the amount falls within the range indicated above, the effects of the present invention tend to be better achieved.

The rubber composition may contain stearic acid.

The stearic acid may be a conventional one, and examples include products of NOF Corporation, Kao Corporation, Wako Pure Chemical Industries, Ltd., and Chiba Fatty Acid Co., Ltd.

The amount of the stearic acid, if present, per 100 parts by mass of the rubber component is preferably 1 part by mass or more, more preferably 2 parts by mass or more, but is preferably 10 parts by mass or less, more preferably 5 parts by mass or less. When the amount falls within the range indicated above, the effects of the present invention tend to be better achieved.

The rubber composition may contain zinc oxide.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide, if present, per 100 parts by mass of the rubber component is preferably 1 part by mass or more, more preferably 2 parts by mass or more, but is preferably 10 parts by mass or less, more preferably 5 parts by mass or less. When the amount falls within the range indicated above, the effects of the present invention tend to be better achieved.

The rubber composition may contain sulfur.

Examples of the sulfur include those generally used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be a product of, for example, Tsurumi Chemical Industry Co., Ltd., Karuizawa Sulfur Co., Ltd., Shikoku Chemicals Corporation, Flexsys, Nippon Kanryu Industry Co., Ltd., and Hosoi Chemical Industry Co., Ltd.

The amount of the sulfur, if present, per 100 parts by mass of the rubber component is preferably 0.5 parts by mass or more, more preferably 1.5 parts by mass or more, but is preferably 10 parts by mass or less, more preferably 5 parts by mass or less. When the amount falls within the range indicated above, the effects of the present invention tend to be better achieved.

The rubber composition may contain an organic crosslinking agent.

Non-limiting examples of the organic crosslinking agent include sulfur-containing compounds such as Tackirol V200 available from Taoka Chemical Co., Ltd., DURALINK IITS (hexamethylene-1,6-bis(thiosulfate) disodium, dihydrate) available from Flexsys, KA9188 (1,6-bis(N,N'-dibenzyl-thio-carbamoyldithio)hexane) available from Lanxess; and organic peroxides such as dicumyl peroxide. These may be used alone or in combinations of two or more.

The amount of the organic crosslinking agent, if present, per 100 parts by mass of the rubber component is preferably 2 parts by mass or more, more preferably 4 parts by mass or more, but is preferably 10 parts by mass or less, more preferably 8 parts by mass or less. When the amount falls within the range indicated above, the effects of the present invention tend to be better achieved.

The rubber composition may contain a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide or guanidine vulcanization accelerators because the effects of the present invention can be more suitably achieved.

The amount of the vulcanization accelerator, if present, per 100 parts by mass of the rubber component is preferably 1 part by mass or more, more preferably 5 parts by mass or more, but is preferably 10 parts by mass or less, more preferably 8 parts by mass or less. When the amount falls within the range indicated above, the effects of the present invention tend to be better achieved.

In addition to the above-described components, the rubber composition may contain additives commonly used in the tire industry, such as fillers such as calcium carbonate, talc, alumina, clay, aluminum hydroxide, and mica; and plasticizers such as liquid resins and ester plasticizers. The amount of such additives is preferably 0.1 to 200 parts by mass per 100 parts by mass of the rubber component.

The rubber composition may be prepared, for example, by kneading the components using a rubber kneading machine such as an open roll mill or a Banbury mixer, and then vulcanizing the kneaded mixture.

The kneading conditions are as follows. In a base kneading step of kneading additives other than vulcanizing agents, vulcanization accelerators, and organic crosslinking agents, the kneading temperature is usually 100 to 180° C., preferably 120 to 170° C. In a final kneading step of kneading vulcanizing agents, vulcanization accelerators, and/or organic crosslinking agents, the kneading temperature is usually 120° C. or lower, and preferably 85 to 110° C. The composition obtained after kneading vulcanizing agents, vulcanization accelerators, and/or organic crosslinking agents is usually vulcanized by, for example, press vulcanization. The vulcanization temperature is usually 140 to 190° C., preferably 150 to 185° C.

The rubber composition can be used for various tire components, suitably for cap treads.

The tire of the present invention may be produced using the rubber composition by usual methods.

Specifically, the rubber composition, before vulcanization, may be extruded into the shape of a cap tread and then assembled with other tire components such as a base tread on a tire building machine in a usual manner to build an unvulcanized tire, which may then be heated and pressurized in a vulcanizer to produce a tire.

The rubber composition used to form a base tread in the tire preferably contains SBR. Non-limiting examples of the SBR include those described above for the rubber composition suitable for cap treads.

In view of fuel economy, handling stability, and performance maintenance during long-term service, the amount of the SBR, if present, based on 100% by mass of the rubber component of the base tread rubber composition is preferably 10% by mass or more, more preferably 20% by mass or more, still more preferably 30% by mass or more. In view of fuel economy and mechanical strength, the amount is also preferably 90% by mass or less, more preferably 80% by mass or less, still more preferably 70% by mass or less.

The rubber composition used to form a base tread in the tire preferably contains an isoprene-based rubber. Non-limiting examples of the isoprene-based rubber include those described above for the rubber composition suitable for cap treads.

The amount of the isoprene-based rubber, if present, based on 100% by mass of the rubber component is preferably 10% by mass or more, more preferably 15% by mass or more, while the upper limit is not particularly critical. When the amount falls within the range indicated above, good mechanical strength can be obtained.

The rubber composition used to form a base tread in the tire preferably contains BR. Non-limiting examples of the BR include those described above for the rubber composition suitable for cap treads.

The amount of the BR, if present, based on 100% by mass of the rubber component is preferably 10% by mass or more, more preferably 15% by mass or more, but is preferably 60% by mass or less, more preferably 40% by mass or less. When the amount falls within the range indicated above, good crack growth resistance can be obtained.

In addition to the above-mentioned materials, the rubber composition used to form a base tread in the tire may appropriately contain chemicals conventionally used in rubber compositions for tires, such as carbon black, silica, waxes, stearic acid, antioxidants, zinc oxide, sulfur, and vulcanization accelerators.

The tire may be of any type and may be either a pneumatic tire or a solid tire, preferably a pneumatic tire.

EXAMPLES

The present invention will be specifically described below with reference to, but not limited to, examples.

The chemicals used in examples and comparative examples are listed below.

The microstructure and weight average molecular weight (Mw) of the rubber components used were analyzed as follows.
<Microstructure>
The amounts of the aromatic vinyl units, vinyl-butadiene units, cis-butadiene units, and cis-isoprene units of the (co)polymers were measured using an AV400 NMR analyzer and a data analysis software TOP SPIN 2.1 both available from BRUKER.
<Weight Average Molecular Weight (Mw)>
The weight average molecular weight (Mw) was determined by gel permeation chromatography (GPC) under the following conditions (1) to (8).
(1) Apparatus: HLC-8220 available from Tosoh Corporation
(2) Separation column: HM-H (two in series) available from Tosoh Corporation
(3) Measurement temperature: 40° C.
(4) Carrier: tetrahydrofuran
(5) Flow rate: 0.6 mL/min
(6) Injection amount: 5 µL
(7) Detector: differential refractometer
(8) Molecular weight standards: polystyrene standards
<NR>: highly purified natural rubber prepared as described in Production Example 1 of JP 5650797 B (cis-isoprene unit content: 100% by mass, pH: 5, nitrogen content: 0.07% by mass, phosphorus content: 92 ppm, gel content: 6% by mass)
<BR>: BR150B available from Ube Industries, Ltd. (vinyl-butadiene unit content based on 100% by mass of butadiene units: 2% by mass, cis-butadiene unit content based on 100% by mass of butadiene units: 96% by mass)
<SBR 1>: modified S-SBR terminated with an alkoxysilyl group (styrene unit content: 20% by mass, vinyl-butadiene unit content based on 100% by mass of butadiene units: 10% by mass, cis-butadiene unit content based on 100% by mass of butadiene units: 60% by mass, Mw: 1,100,000)
<SBR 2>: modified S-SBR terminated with 1% by mass of cis-isoprene units and an alkoxvsilyl group (styrene unit content: 10% by mass, vinyl-butadiene unit content based on 100% by mass of butadiene units: 4% by mass, cis-butadiene unit content based on 100% by mass of butadiene units: 80% by mass, Mw: 1,000,000)
<SBR 3>: modified S-SBR terminated with an alkoxysilyl group (styrene unit content: 25% by mass, vinyl-butadiene unit content based on 100% by mass of butadiene units: 19% by mass, cis-butadiene unit content based on 100% by mass of butadiene units: 40% by mass, Mw: 600,000)
<SBR 4>: modified S-SBR terminated with an alkoxysilyl group (styrene unit content: 25% by mass, vinyl-butadiene unit content based on 100% by mass of butadiene units: 57% by mass, cis-butadiene unit content based on 100% by mass of butadiene units: 20% by mass, Mw: 1,000,000)
<Hydrogenated SBR>: hydrogenated product of modified SBR terminated with an alkoxysilyl group (styrene unit content: 25% by mass, hydrogenated butadiene unit content based on 100% by mass of butadiene units: 90% by mass, vinyl-butadiene unit content based on 100% by mass of butadiene units before hydrogenation: 0% by mass, cis-butadiene unit content based on 100% by mass of butadiene units before hydrogenation: 5% by mass, Mw: 895)
<Olefin copolymer>: styrene/butadiene/ethylene copolymer prepared as described in the polymerization of Production Example 1 of JP 4088258 B (styrene unit content: 20% by mass, vinyl-butadiene unit content: 10% by mass, cis-butadiene unit content: 30% by mass, ethylene unit content: 40% by mass)
<Styrene-based TPE>: product obtained by hydrogenation with Ti of a modified copolymer prepared as described in Production Example 3 of JP 2014-105293 A, but changing the amount of styrene and other conditions (modified styrene/hydrogenated butadiene/styrene block copolymer terminated with an alkoxysilyl group (modified SEBS), styrene unit content: 28% by mass, hydrogenated butadiene unit content: 90% by mass, vinyl-butadiene unit content based on 100% by mass of butadiene units before hydrogenation: 0% by mass, cis-butadiene unit content based on 100% by mass of butadiene units before hydrogenation: 5% by mass, Mw: 120,000)
<Silica>: ULTRASIL 9000GR (BET: 240 $m^2/g$, CTAB: 200 $m^2/g$) available from Evonik
<Silane coupling agent>: Si363 available from Evonik
<Carbon black>: DIABLACK SA ($N_2$SA: 137 $m^2/g$) available from Mitsubishi Chemical Corporation.
<Oil>: Vivatec 500 (TDAE oil) available from H&R
<Resin 1 (styrene-based resin)>: SYLVARES SA85 (α-methylstyrene/styrene copolymer, softening point: 85° C.) available from Arizona Chemical
<Resin 2 (C5/C9 resin)>: ECR-373 (C5 fraction/C9 fraction copolymer, softening point: 86° C.) available from Exxon Mobil Corporation
<Wax>: sunflower wax (sunflower seed-derived wax, softening point: 77° C.) available from Koster Keunen
<Antioxidant>: NOCRAC 6C (N-phenyl-N'-(1,3-dimethylbutyl)-p-phenylenediamine) available from Ouchi Shinko Chemical Industrial Co., Ltd.
<Zinc oxide>: zinc oxide #2 available from Mitsui Mining & Smelting Co., Ltd.

\<Sulfur\>: powdered sulfur available from Tsurumi Chemical Industry Co., Ltd.

\<Organic crosslinking agent\>: Vulcuren VP KA9188 (1,6-bis(N,N'-dibenzylthiocarbamoyldithio)hexane) available from Lanxess \<Stearic acid\>: stearic acid beads "TSUBAKI" available from NOF Corporation \<Vulcanization accelerator 1\>: NOCCELER D (N,N'-diphenylguanidine) available from Ouchi Shinko Chemical Industrial Co., Ltd.

\<Vulcanization accelerator 2\>: NOCCELER CZ (N-cyclohexyl-2-benzothiazolylsulfenamide) available from Ouchi Shinko Chemical industrial Co., Ltd.

\<Method of Preparing Rubber Composition for Cap Treads\>

According to each of the formulations shown in Table 1, the materials listed in the base kneading step section were kneaded in a 1.7 L Banbury mixer (Kobe Steel, Ltd.) at 150° C. for five minutes to give a kneaded mixture. Next, the chemicals listed in the final kneading step section were added to the kneaded mixture, followed by kneading in an open roll mill at 80° C. for five minutes to obtain an unvulcanized rubber composition for cap treads.

The unvulcanized rubber composition for cap treads was press-vulcanized using a 0.5 mm-thick mold at 170° C. for 20 minutes to obtain a vulcanized rubber sheet.

The vulcanized rubber sheets prepared as above were evaluated as described below. Table 1 shows the results.

In Table 1, the rubber components with a composition ratio satisfying the limitations recited in claim 1 are marked with "Y", and those not satisfying the limitations are marked with "N".

\<Viscoelastic Testing\>

The tan δ at −5° C. and tan δ at 80° C. of the vulcanized rubber sheets were measured using a viscoelastic spectrometer at a frequency of 10 Hz, an initial strain of 10%, and a dynamic strain amplitude of 2%. The vulcanized rubber sheets that satisfy relationship (3) or (4) are marked with "Y", and those that do not are marked with "N".

Moreover, the tan δ of the vulcanized rubber sheets was measured over a temperature range from −90° C. to 40° C. at 5° C. intervals using a viscoelastic spectrometer at a frequency of 10 Hz, an initial strain of 10%, and a dynamic strain amplitude of 0.25% to obtain a viscoelastic spectrum. The viscoelastic spectra obtained as above were analyzed, and the vulcanized rubber sheets that had a single peak within a predetermined temperature range are marked with "Y", and those that did not are marked with "N".

Furthermore, the Tg of the vulcanized rubber sheets was determined based on the respective viscoelastic spectra, and the vulcanized rubber sheets that satisfy relationship (1) are marked with "Y", and those that do not are marked with "N".

(Hardness Measurement)

The hardness (Hs) at 23° C. of the vulcanized rubber sheets was measured using a type A durometer in accordance with JIS K 6253: "Rubber, vulcanized or thermoplastic—Determination of hardness". The vulcanized rubber sheets that satisfy relationship (2) are marked with "Y", and those that do not are marked with "N".

\<Microscopic Observation\>

Slices having a thickness of about 100 nm were cut from the vulcanized rubber sheets using a microtome and observed with a transmission electron microscope (H-7100, Hitachi, Ltd.). The vulcanized rubber sheets that had a rubber component with a single phase morphology are marked with "Y", and those that did not are marked with "N".

\<Method of Preparing Rubber Composition for Base Treads\>

According to each of the formulations shown in Table 2, the materials listed in the base kneading step section were kneaded in a 1.7 L Banbury mixer (Kobe Steel, Ltd.) at 150° C. for five minutes to give a kneaded mixture. Next, the chemicals listed in the final kneading step section were added to the kneaded mixture, followed by kneading in an open roll mill at 80° C. for five minutes to obtain an unvulcanized rubber composition for base treads.

\<Method of Preparing Test Tire\>

The unvulcanized rubber compositions for cap treads were formed into a cap tread shape, and the unvulcanized rubber composition for base treads was formed into a base tread shape. Then, they were assembled with other tire components on a tire building machine to build an unvulcanized tire, which was then vulcanized at 170° C. for 10 minutes to prepare a test tire (size: 215/55R16, tire for passenger cars).

The test tires prepared as above were evaluated as described below. Table 1 shows the results.

\<Wet Grip\>

A set of test tires were mounted on a front-engine, front-wheel-drive car of 2000 cc displacement made in Japan, and the car was run on a wet road with a surface temperature of 25° C. Then, the distance required for the car to stop after the brakes that lock up were applied at 150 km/h was measured and expressed as an index using the equation below, with Comparative Example 1 set equal to 100. A higher index indicates better wet grip (wet braking performance) during high-speed running.

(Wet grip index)=(Stopping distance of Comparative Example 1)/(Stopping distance of each formulation example)×100

\<Abrasion Resistance 1\>

A set of test tires were mounted on a front-engine, front-wheel-drive car of 2000 cc displacement made in Japan. The depth of the grooves on the cap tread portion was measured after the car was run 5000 km at 100 to 150 km; hr at an air temperature of 22 to 27° C. under the same road conditions as each test tire, including wet surfaces and sharp curves. A distance that caused a 1 mm decrease in groove depth was calculated and expressed as an index using the equation below, with Comparative Example 1 set equal to 100. A higher index indicates better abrasion resistance during high-speed running.

(Abrasion resistance 1 index)=(Distance that caused a 1 mm decrease in groove depth of each formulation example)/(Distance that caused a 1 mm decrease in groove depth of Comparative Example 1)×100

\<Abrasion Resistance 2\>

After the abrasion resistance 1 test, the tires were observed for the presence of chips and chunks of the tread and evaluated with the following criteria. A higher index indicates better abrasion resistance during high-speed running.

100: Almost no chips or chunks observed.
80: Small chips partly observed.
60: Chips and chunks observed.
40: Large tread chunks observed.

\<Handling Stability\>

Two drivers subjectively evaluated control stability during the initial phase of running in the abrasion resistance 1 test using the criteria below where Comparative Example 1 is set equal to 100. The results were averaged to obtain a handling stability index. A higher index indicates better handling stability during high-speed running.
140: Excellent
120: Very good
110: Good
100: Comparable to Comparative Example 1
80: Slightly poor
70: Poor
60: Very poor <Fuel Economy>

The rolling resistance of the test tires was measured using a rolling resistance tester by running each test tire mounted on a rim at an internal pressure of 230 kPa, a load of 3.43 kN, and a speed of 160 km/h, and expressed as an index (fuel economy index), with Comparative Example 1 set equal to 100. A higher index indicates better fuel economy during high-speed running.

<Performance Maintenance after Long-Term Service>

After the abrasion resistance 1 test, the tires were removed from the car and left outside and exposed to sunlight, wind, and rain for half a year. Then, the tires were mounted on the same car (front-engine, front-wheel-drive car of 2,000 cc displacement made in Japan) as in the abrasion resistance 1 test, and the car was run at an air temperature of 25° C. under road conditions including wet surfaces and sharp curves to determine the handling stability and braking response, which were then compared to those at the beginning of the abrasion resistance 1 test and evaluated based on the criteria below (performance maintenance index). A higher index indicates less performance degradation.
100: Almost the same.
90: Slight performance degradation noticed.
80: A little performance degradation noticed.
60: Significant performance degradation noticed.

TABLE 1

| | | Rubber composition for cap treads | Example 1 | Example 2 | Example 3 | Example 4 | Example 5 | Comparative Example 1 | Comparative Example 2 | Comparative Example 3 | Comparative Example 5 |
|---|---|---|---|---|---|---|---|---|---|---|---|
| Amount (parts by mass) | Base kneading step | NR | 5 | 3 | 3 | 2 | 2 | — | 3 | 10 | 5 |
| | | BR | 15 | — | — | — | — | 15 | — | 30 | 15 |
| | | SBR 1 | 80 | 27 | 27 | — | 40 | 85 | — | — | — |
| | | SBR 2 | — | 70 | — | 68 | 30 | — | 97 | — | — |
| | | SBR 3 | — | — | — | — | — | — | — | 60 | — |
| | | SBR 4 | — | — | — | — | — | — | — | — | 80 |
| | | Hydrogenated SBR | — | — | 70 | — | — | — | — | — | — |
| | | Olefin copolymer | — | — | — | 30 | — | — | — | — | — |
| | | Styrene-based TPE | — | — | — | — | 28 | — | — | — | — |
| | | Silica | 110 | 150 | 120 | 140 | 100 | 110 | 150 | 85 | 110 |
| | | Stone coupling agent | 11 | 15 | 12 | 14 | 10 | 11 | 15 | 8 | 11 |
| | | Carbon black | 5 | 5 | 5 | 5 | 5 | 5 | 5 | 5 | 5 |
| | | Oil | 20 | 25 | 20 | 20 | 20 | 20 | 30 | 10 | 20 |
| | | Resin 1 | — | 70 | 50 | 35 | 40 | — | 40 | 8 | — |
| | | Resin 2 | 50 | — | — | 25 | — | 50 | — | — | 50 |
| | | Wax | 2 | 2 | 2 | 2 | 2 | 2 | 2 | 2 | 2 |
| | | Stearic acid | 0.5 | 0.5 | 0.5 | 0.5 | 0.5 | 0.5 | 0.5 | 0.5 | 0.5 |
| | | Vulcanization accelerator 1 | 1.5 | 1.5 | 1.5 | 1.5 | 1.5 | 1.5 | 1.5 | 1.5 | 1.5 |
| | | Antioxidant | 2 | 2 | 2 | 2 | 2 | 2 | 2 | 2 | 2 |
| | | Zinc oxide | 1 | 1 | 1 | 1 | 1 | 1 | 1 | 1 | 1 |
| | Final kneading step | Sulfur | 1.5 | 2 | 1.5 | 1.5 | 1.5 | 1.5 | 2 | 5 | 1.5 |
| | | Organic crosslinking agent | 4 | 4 | 4 | 4 | 4 | 4 | 4 | 4 | 4 |
| | | Stearic acid | 1 | 1 | 1 | 1 | 1 | 1 | 1 | 1 | 1 |
| | | Vulcanization accelerator 1 | 0.5 | 0.5 | 0.5 | 0.5 | 0.5 | 0.5 | 0.5 | 0.5 | 0.5 |
| | | Vulcanization accelerator 2 | 2.5 | 2.5 | 2.5 | 2.5 | 2.5 | 2.5 | 2.5 | 2.5 | 2.5 |
| Chemical composition of rubber component (% by mass) | | Aromatic vinyl unit | 16 | 12 | 23 | 13 | 19 | 17 | 9.7 | 15 | 20 |
| | | Vinyl-butadiene unit | 6.7 | 4.7 | 2.2 | 5.4 | 4.3 | 7.1 | 3.5 | 9.2 | 34.5 |
| | | Cis-butadiene unit | 53 | 63 | 16 | 57 | 42 | 55 | 69 | 47 | 26 |
| | | Cis-isoprene unit | 5 | 3.7 | 3 | 2.7 | 2.3 | 0 | 4 | 10 | 5 |
| Chemical composition and physical properties | | Satisfaction of composition ratio | Y | Y | Y | Y | Y | N | Y | N | N |
| | | Satisfaction of relationship (1) | Y | Y | Y | Y | Y | Y | N | N | Y |
| | | Satisfaction of relationship (2) | Y | Y | Y | Y | Y | Y | Y | Y | Y |
| | | Satisfaction of relationship (3) | Y | Y | Y | Y | Y | Y | N | Y | Y |
| | | Satisfaction of relationship (4) | Y | Y | Y | Y | Y | Y | Y | Y | N |
| | | Viscoelastic spectrum having a single peak at −80° C. of higher | Y | Y | Y | Y | Y | Y | Y | N | N |
| | | Viscoelastic spectrum having a single peak at −80° C. of higher | Y | Y | Y | Y | Y | Y | Y | N | N |
| | | Rubber component having a single-phase morphology | Y | Y | Y | Y | Y | Y | Y | N | N |
| Evaluation | | Wet grip index | 105 | 125 | 110 | 110 | 110 | 100 | 102 | 90 | 105 |
| | | Abrasion resistance 1 index | 110 | 140 | 140 | 120 | 130 | 100 | 105 | 80 | 90 |
| | | Abrasion resistance 2 index | 100 | 100 | 100 | 100 | 100 | 60 | 100 | 80 | 80 |
| | | Handling stability index | 110 | 120 | 140 | 120 | 140 | 100 | 80 | 80 | 105 |
| | | Fuel economy index | 100 | 95 | 110 | 105 | 120 | 100 | 90 | 115 | 90 |
| | | Performance maintenance index | 90 | 90 | 100 | 100 | 100 | 80 | 60 | 80 | 80 |
| | | Comprehensive evaluation (sum of indexes) | 615 | 670 | 700 | 655 | 700 | 540 | 537 | 525 | 550 |

TABLE 2

| Rubber composition for base treads | | | Formulation example |
|---|---|---|---|
| Amount (parts by mass) | Base kneading step | NR | 25 |
| | | BR | 25 |
| | | SBR 1 | 50 |
| | | Carbon black | 40 |
| | | Silica | 5 |
| | | Oil | 30 |
| | | Wax | 1.5 |
| | | Stearic acid | 2 |
| | | Antioxidant | 2 |
| | | Zinc oxide | 3 |
| | Final kneading step | Sulfur | 2.5 |
| | | Vulcanization accelerator 2 | 2 |

As shown in Table 1, the rubber compositions of the examples which contained, based on 100% by mass of the rubber component therein: 3 to 25% by mass of a component derived from an aromatic vinyl monomer; 0 to 15% by mass of a component derived from a butadiene monomer and having a vinyl configuration; 1 to 90% by mass of a component derived from a butadiene monomer and having a cis configuration; and 1 to 6% by mass of a component derived from an isoprene monomer and having a cis configuration and which had, after vulcanization, physical properties satisfying relationships (1) and (2) achieved a balanced improvement of wet grip, abrasion resistance, handling stability, and fuel economy during high-speed running and further exhibited less performance degradation after long-term service, It should also be noted that some of these examples exhibited values around the upper limit of relationship (1), the lower limit of relationship (1), the upper limit of relationship (2), the lower limit of relationship (2), the lower limit of relationship (3), or the upper limit of relationship (4).

The invention claimed is:

1. A tire, comprising a cap tread,
the cap tread comprising a rubber composition for tires, the rubber composition comprising, based on 100% by mass of a rubber component therein:
3 to 25% by mass of a component derived from an aromatic vinyl monomer;
0 to 15% by mass of a component derived from a butadiene monomer and having a vinyl configuration;
1 to 90% by mass of a component derived from a butadiene monomer and having a cis configuration; and
1 to 6% by mass of a component derived from an isoprene monomer and having a cis configuration,
the rubber composition having, after vulcanization, physical properties satisfying the following relationships (1) and (2):

$$-25°\text{C.} < Tg < 0°\text{C.} \quad (1)$$

wherein Tg denotes a temperature at tan δ peak determined by viscoelastic measurements at a frequency of 10 Hz, an initial strain of 10%, and a dynamic strain amplitude of 0.25%; and $$65 < Hs < 75 \quad (2)$$

wherein Hs denotes a hardness at 23° C. measured in accordance with JIS K6253.

2. The tire according to claim 1,
wherein the rubber composition has a viscoelastic spectrum with a single peak at −80° C. or higher obtained by viscoelastic measurements at a frequency of 10 Hz, an initial strain of 10%, and a dynamic strain amplitude of 0.25%.

3. The tire according to claim 2,
wherein the viscoelastic spectrum shows a single peak at −90° C. or higher.

4. The tire according to claim 1,
wherein the rubber composition has, after vulcanization, physical properties satisfying the following relationships (3) and (4):

$$\tan \delta 1 > 0.80 \quad (3)$$

and $$\tan \delta 2 < 0.15 \quad (4)$$

wherein tan δ1 denotes a tan δ at −5° C. determined by viscoelastic measurements at a frequency of 10 Hz, an initial strain of 10%, and a dynamic strain amplitude of 2%, and
tan δ2 denotes a tan δ at 80° C. determined by viscoelastic measurements at a frequency of 10 Hz, an initial strain of 10%, and a dynamic strain amplitude of 2%.

5. The tire according to claim 1,
wherein the rubber component comprises a solution-polymerized styrene butadiene rubber that has 25% by mass or less of a component derived from a butadiene monomer and having a vinyl configuration based on 100% by mass of components derived from a butadiene monomer.

6. The tire according to claim 5,
wherein the solution-polymerized styrene butadiene rubber has a weight average molecular weight of 800,000 or more.

7. The tire according to claim 1,
wherein the rubber component comprises at least one selected from the group consisting of hydrogenated styrene butadiene rubbers, styrene-based thermoplastic elastomers, and olefin/conjugated diene/styrene copolymers.

8. The tire according to claim 1,
wherein the rubber composition comprises silica in an amount of 100 to 300 parts by mass per 100 parts by mass of the rubber component.

9. The tire according to claim 1,
wherein the rubber component has a single phase morphology.

10. The tire according to claim 1,
wherein the rubber composition comprises a resin having a softening point of 25° C. or higher in an amount of 1 to 60 parts by mass per 100 parts by mass of the rubber component.

11. The tire according to claim 10,
wherein the resin is at least one selected from the group consisting of styrene-based resins, terpene-based resins, C5 resins, C5/C9 resins, DCPD-based resins, and rosin-based resins.

12. The tire according to claim 1,
wherein the tire comprises a base tread comprising a rubber composition that comprises, based on 100% by mass of a rubber component therein, 10% by mass or more of a styrene butadiene rubber.

* * * * *